US010194184B2

(12) United States Patent
Amento et al.

(10) Patent No.: US 10,194,184 B2
(45) Date of Patent: *Jan. 29, 2019

(54) DYNAMIC SYNCHRONIZATION OF MEDIA STREAMS WITHIN A SOCIAL NETWORK

(71) Applicant: AT&T Intellectual Property I, L.P., Atlanta, GA (US)

(72) Inventors: Brian Scott Amento, Morris Plains, NJ (US); Larry Stead, Upper Montclair, NJ (US); Christopher Harrison, Mount Kisco, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,718

(22) Filed: Nov. 29, 2016

(65) Prior Publication Data

US 2017/0078720 A1    Mar. 16, 2017

Related U.S. Application Data

(63) Continuation of application No. 14/938,633, filed on Nov. 11, 2015, now Pat. No. 9,532,091, which is a (Continued)

(51) Int. Cl.
*H04N 7/173* (2011.01)
*H04N 21/4788* (2011.01)
(Continued)

(52) U.S. Cl.
CPC ....... *H04N 21/242* (2013.01); *H04N 7/17318* (2013.01); *H04N 21/23424* (2013.01); (Continued)

(58) Field of Classification Search
CPC combination set(s) only.
See application file for complete search history.

(56) References Cited

U.S. PATENT DOCUMENTS 5,446,490 A   8/1995   Blahut et al.
5,596,574 A   1/1997   Perlman et al.
(Continued)

OTHER PUBLICATIONS

Non-Final Office Action, U.S. Appl. No. 12/112,981, dated Sep. 30, 2010, 17 pages.
(Continued)

*Primary Examiner* — Kieu Oanh T Bui
(74) *Attorney, Agent, or Firm* — Jackson Walker L.L.P.

(57) ABSTRACT

A method of synchronizing first and second streams of a multimedia content program is operable for determining a temporal difference indicative of a relative timing between first and second streams of the program, the first stream being provided to a first multimedia processing resource (MPR) and the second stream being provided to a second MPR. The method includes manipulating at least one of the streams to reduce the temporal difference until the temporal difference is less than a predetermined threshold and enabling a viewer of the first stream to interact with a viewer of the second stream regarding the program. Interactions are visually detectable on a first display screen corresponding to the first MPR.

19 Claims, 5 Drawing Sheets

Related U.S. Application Data continuation of application No. 14/512,774, filed on Oct. 13, 2014, now Pat. No. 9,210,455, which is a continuation of application No. 14/039,783, filed on Sep. 27, 2013, now Pat. No. 8,863,216, which is a continuation of application No. 12/113,028, filed on Apr. 30, 2008, now Pat. No. 8,549,575.

(51) Int. Cl.
| | |
|---|---|
| H04N 21/235 | (2011.01) |
| H04N 21/242 | (2011.01) |
| H04N 21/24 | (2011.01) |
| H04N 21/266 | (2011.01) |
| H04N 21/6405 | (2011.01) |
| H04N 21/6408 | (2011.01) |
| H04N 21/234 | (2011.01) |
| H04N 21/431 | (2011.01) |
| H04N 21/442 | (2011.01) |
| H04N 21/81 | (2011.01) |
| H04L 12/58 | (2006.01) |
| G06Q 50/00 | (2012.01) |

(52) U.S. Cl.
CPC ... *H04N 21/2407* (2013.01); *H04N 21/26616* (2013.01); *H04N 21/4312* (2013.01); *H04N 21/44222* (2013.01); *H04N 21/4788* (2013.01); *H04N 21/6405* (2013.01); *H04N 21/6408* (2013.01); *H04N 21/812* (2013.01); *G06Q 50/01* (2013.01); *H04L 51/32* (2013.01)

(56) References Cited

U.S. PATENT DOCUMENTS

| | | | |
|---|---|---|---|
| 6,377,972 B1 | 4/2002 | Guo et al. | |
| 6,909,708 B1 | 6/2005 | Krishnaswamy et al. | |
| 6,975,600 B1 | 12/2005 | Vaughan et al. | |
| 6,985,172 B1* | 1/2006 | Rigney | G06K 9/00335 348/149 |
| 7,082,142 B1 | 7/2006 | Begeja | |
| 7,145,898 B1 | 12/2006 | Elliott | |
| 7,280,741 B2* | 10/2007 | Klausberger | G11B 27/034 386/332 |
| 7,434,248 B2 | 10/2008 | Tanaka et al. | |
| 7,698,724 B1 | 4/2010 | Day | |
| 2002/0019978 A1 | 2/2002 | Terretta | |
| 2002/0112247 A1 | 8/2002 | Horner et al. | |
| 2002/0143852 A1 | 10/2002 | Guo et al. | |
| 2003/0007567 A1 | 1/2003 | Newman et al. | |
| 2003/0098869 A1 | 5/2003 | Arnold et al. | |
| 2004/0015995 A1 | 1/2004 | Shao et al. | |
| 2004/0068758 A1 | 4/2004 | Daily et al. | |
| 2005/0060608 A1 | 3/2005 | Marchand | |
| 2005/0166224 A1 | 7/2005 | Ficco | |
| 2005/0216910 A1 | 9/2005 | Marchand | |
| 2007/0071037 A1* | 3/2007 | Abraham | H04N 21/235 370/503 |
| 2007/0234196 A1 | 10/2007 | Nicol et al. | |
| 2007/0298836 A1 | 12/2007 | Yanover | |
| 2008/0005113 A1 | 1/2008 | Li | |
| 2008/0005114 A1 | 1/2008 | Li | |
| 2008/0005120 A1 | 1/2008 | Li | |
| 2008/0005195 A1 | 1/2008 | Li | |
| 2009/0119737 A1 | 5/2009 | Perlman et al. | |
| 2009/0276820 A1 | 11/2009 | Amento | |

OTHER PUBLICATIONS

Final Office Action, U.S. Appl. No. 12/112,981, dated Apr. 26, 2011, 19 pages.

* cited by examiner

DYNAMIC SYNCHRONIZATION OF MEDIA STREAMS WITHIN A SOCIAL NETWORK

This application is a continuation of U.S. patent application Ser. No. 14/938,633, filed Nov. 11, 2015, which is a continuation of U.S. patent application Ser. No. 14/512,774, filed Oct. 13, 2014 and issued on Dec. 8, 2015 as U.S. Pat. No. 9,210,455, which is a continuation of U.S. patent application Ser. No. 14/039,783, filed Sep. 27, 2013 and issued on Oct. 14, 2014 as U.S. Pat. No. 8,863,216, which is a continuation of U.S. patent application Ser. No. 12/113,028, filed Apr. 30, 2008 and issued on Oct. 1, 2013 as U.S. Pat. No. 8,549,575, which are herein incorporated by reference in their entirety.

BACKGROUND

Field of the Disclosure

The present disclosure relates to the distribution of multimedia content including television, video on demand, and pay per view programs.

Description of the Related Art

Many multimedia distribution services have the ability to multicast content to multiple viewers simultaneously or to unicast content to a single viewer. Multicasting conserves bandwidth consumption for the service provider. Unicasting is beneficial for its ability to provide content to different viewers asynchronously.

DESCRIPTION OF THE EMBODIMENT(S)

Figure 1:
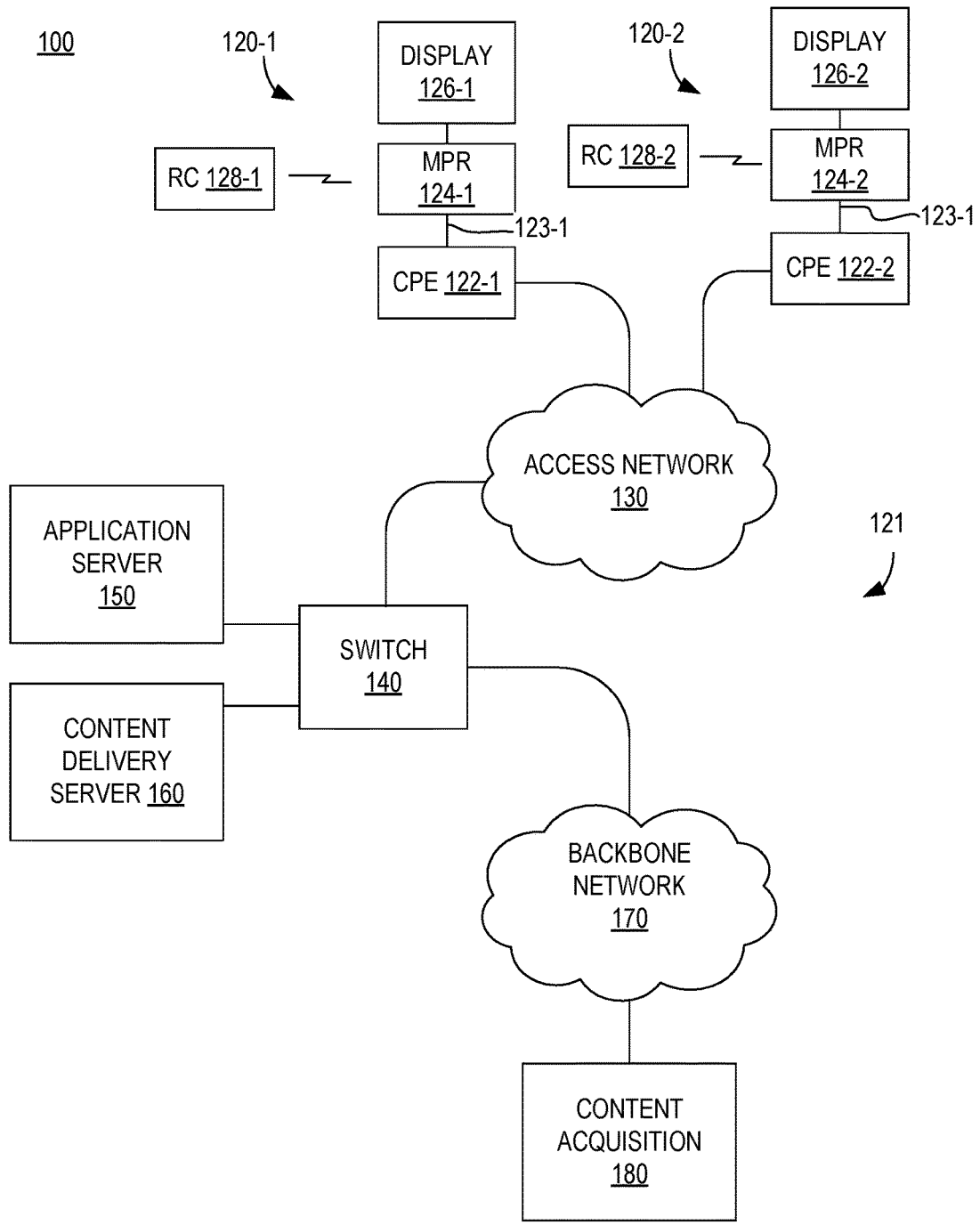
FIG. 1 is a block diagram of selected elements of a multimedia content distribution network.

In one aspect, a disclosed method for synchronizing multiple streams of a multimedia content program includes providing the multimedia content program to a first viewer via a first multimedia stream in response to receiving first request to view the multimedia content program from the first viewer providing the multimedia content program to a second viewer via a second multimedia stream in response to a second request from the second viewer. The method includes identifying the first and second streams as streams to be synchronized and determining a temporal or synchronization delta or difference that indicates a temporal relationship between the first and second streams. A timing of at least one of the streams is altered to reduce the synchronization delta. When the synchronization delta drops below a specified threshold, the multimedia content program may be provided to the first and second viewers via a multimedia stream that is common to the first and second viewers.

The identification of two or more streams as streams to be synchronized may be based on a social network concept. Viewers may define buddy lists and indicate levels of affinity for each person in their lists. In these embodiments, the selection of which streams to synchronize may be based, at least in part, on buddy list data, affinity level data, or both. The affinity level may determine or influence the aggressiveness of a particular synchronization. As an example, an application program running on a first viewer's set top box or other multimedia processing resource, may retrieve information identifying other viewers who are watching the same program as the first viewer, even if the other viewers are viewing a different point in time of the program.

The application program may present this information to the user in a graphical format such as a timeline representation of a program, where the temporal "location" of each viewer is indicated. The application can selectively display only those other viewers that are identified in the first viewer's buddy list. The first viewer may then identify a particular viewer or viewers to whom the first viewer wishes to synchronize. Alternatively, the application program may access buddy list information, affinity level information, as well as information indicating the relative temporal proximity of the viewers, to identify viewers who are to be synchronized. The synchronization procedure itself may vary depending upon the level of affinity and the temporal proximity between or among two or more viewers to be synchronized. Synchronization may include a synchronization "jump" in which the streams to at least one of the viewers is stopped and resumed at a different point in time, skipping over the content between the two points in time. Alternatively, synchronization can be achieved by group convergence, where two or more viewers are synchronized to a third viewer using speed up or slow down techniques. Synchronization between two viewers may include a single convergence technique in which a first viewer is sped up or slowed to until converging with a second viewer or a double convergence technique in which a first viewer is sped up and a second viewer is slowed down until the two viewers converge in the middle.

Altering of the timing may include selecting a first advertisement sequence for the first viewer where the first advertisement sequence has a first duration and selecting a second advertisement sequence for the second viewer where the second advertisement sequence has a second duration. The first and second durations may differ approximately by the synchronization delta. The method may incorporate or otherwise include the first advertisement sequence in the first multimedia stream and the second advertisement sequence in the second multimedia stream. Determining the synchronization delta may include determining a difference between a first timestamp associated with the first multimedia stream and a second timestamp associated with second multimedia stream. The timestamps may indicate respective start times of the first and second streams. Alternatively, the timestamps may indicate when processing of a selected frame in the first and second streams occurred.

In some embodiments, either the first stream, the second stream, or both are unicast to the applicable viewers before the timing is altered. In other embodiments, the first stream may be unicast and the second stream may be multicast to a multicast group that includes the second viewer, but not the first viewer. Thus, either the first stream, the second stream, or both may be replaced with a multicast stream. Moreover, two or more multicast streams may be synchronized to into a common multicast stream to further consolidate the streams and further conserve bandwidth.

In another aspect, a disclosed computer program product includes instructions, stored in tangible computer readable media, for synchronizing multiple streams of a particular program. The instructions include instructions to determine a temporal delta between first and second streams of the program and incorporate first additional content having a first duration into the first stream and second additional content having a second duration, different than the first duration, into the second stream. The difference in the durations of the first and second streams reduces the temporal delta between the first and second streams. The first additional content may be implemented as a first advertisement sequence and the second additional content may be implemented as a second advertisement sequence. The program product may include instructions to respond to each request for the program by initiating a corresponding stream as a unicast stream. In this embodiment, each viewer may obtain the program asynchronously with little or no delay or latency is associated with each request.

In still another aspect, a disclosed multimedia processing resource (MPR) includes a network interface to receive a stream representing a multimedia content program, a decoder to process the stream as a sequence of frames, a display interface to present the sequence of frames to a display screen, and a processor having access to storage media. Collectively, the storage media may include computer executable instructions to respond to an indication of a temporal delta by identifying additional content having a specified duration and incorporating the additional content into the sequence of frames. The indicated temporal delta may influence the identification of the additional content so that, for example, the duration of the additional content and, in some embodiments, a difference in the durations of the two additional content sequences, is influenced by the temporal delta and is intended to reduce the temporal delta of the two streams after the additional content is processed and displayed.

In some embodiments, including Internet protocol television embodiments, multimedia streams include a sequence of Internet protocol based packets. The program may be received as a multicast stream after the additional content completes. The instructions may include instructions to identify other viewers receiving the multicast stream, represent the other viewers as icons, avatars, or other objects on the display, and enable a viewer to send a text message, remark, or other type of interaction to the other viewers where the interaction may then appear on the displays of the respective viewers, visually associated with the object representing the authoring user, e.g., attached to, adjacent to, above, overlying, and so forth.

In still another aspect, a disclosed method of synchronizing multiple streams of a multimedia content program includes determining a temporal delta indicative of a relative timing between first and second streams of the program, the first stream being provided to a first multimedia processing resource (MPR) or set top box (STB) and the second stream being provided to a second MPR. The method includes manipulating at least one of the streams to reduce the temporal delta until the temporal delta is less than a specified threshold and enabling a viewer of the first stream to interact with a viewer of the second stream regarding the program. Interactions are visually detectable on a first display screen corresponding to the first MPR.

Determining the temporal delta may include determining a difference between a first timestamp associated with the first stream and a second timestamp associated with second stream. The first and second timestamps may indicate start times of the first and second streams. Alternatively, the timestamps may indicate processing of a selected frame in the applicable stream by the applicable MPR. Either of the first and second streams may be unicast to the corresponding MPR. In some embodiments, the first and second streams are both unicast to the corresponding MPR before the manipulating of the streams. After the manipulating, the first and second streams may be provided to the first and second MPRs via a common, multicast stream. Alternatively, after the manipulating, the first and second streams may continue to be provided to the first and second MPRs via respective unicast streams.

The method may include providing a visually detectable object representing the second viewer on the first display screen and providing a visually detectable representation of a text message sent by the second viewer where the text message representation is adjacent, connected to, or otherwise visually associated with the object. The visually detectable object may be provided as an overlay to the display of the program. Some embodiments may further provide an additional visually detectable object representing a third viewer of the program via a third stream, in which case, the manipulating may include manipulating any one of the first, second, and third streams. In these embodiments, the method may include enabling the first viewer to define a first viewer input indicating which of the second and third streams to manipulate, thereby enabling the first viewer to select the other viewer(s) with whom the first viewer wants to synchronize and collaborate.

Turning now to the drawings, FIG. 1 is a block diagram illustrating selected elements of an embodiment of a multimedia content delivery network 100. The depicted embodiment of multimedia content delivery network 100 includes functionality to synchronize two or more viewers watching the same program or other item of multimedia content. Although multimedia content is not limited to television, video-on-demand, or pay-per-view programs, the depicted embodiments of network 100 and its capabilities are described herein with primary reference to these types of multimedia content, which are interchangeably referred to herein as multimedia content program(s), multimedia programs or, simply, programs.

The elements of multimedia content delivery network 100 illustrated in FIG. 1 emphasize the network's functionality for delivering multimedia content to a set of one or more subscribers. As depicted in FIG. 1, content delivery network 100 includes a one or more clients 120 where each client may represent a different subscriber and a service provider 121 that encompasses resources to acquire, process, and deliver programs to clients 120. Clients 120 and service provider 121 are demarcated by an access network 130 to which clients 120 and service provider 121 are connected. In some embodiments, access network 130 is an Internet protocol network, while in others, access network 130 may be implemented as a conventional coaxial based network. In IP implementations of access network 130, access network may employ a physical layer of unshielded twist pair cables, fiber optic cables, or both. As an example, multimedia content delivery network 100 may employ digital subscribe line (DSL) compliant twisted pair connections between clients 120 and a node (not depicted) in access network 130 while fiber cable or other broadband cable connects service provider resources to a node in access network 130. In other embodiments, the broadband cable may extend all the way to clients 120.

The clients 120 depicted in FIG. 1 a network appliance identified as customer premises equipment (CPE) 122 that connects to access network 130 and to a multimedia processing resource (MPR) 124. CPE 122 may supply routing, firewall, or other services for clients 120. CPE 122 may include elements of a broadband modem such as an asynchronous DSL (ASDL) modem as well as elements of a local area network (LAN) access point that supports a LAN 123 to which MPR 124 connects. LAN 123 may, in some embodiments, represent an Ethernet compliant LAN, also sometimes referred to as an IEEE 811 LAN. Clients 120 as depicted in FIG. 1 further include a display device or, more simply, a display 126. A remote control 128 of client 120 is operable to communicate wirelessly to MPR 124 using infrared or radio frequency signals as is well known. MPRs 124 may receive input via buttons (not depicted) located on side panels of MPRs 124.

Figure 2:
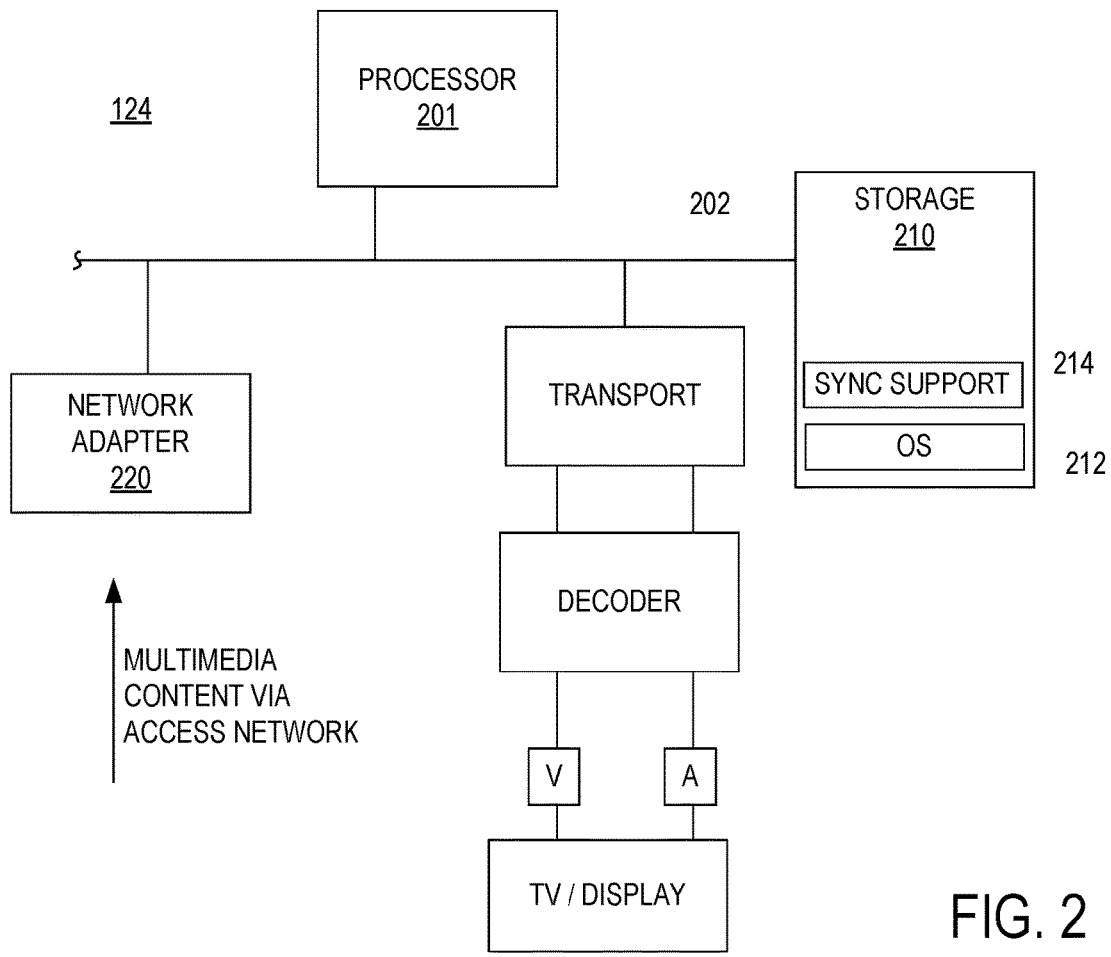
FIG. 2 is block diagram of selected elements of an embodiment of a multimedia processing resource suitable for hosting a synchronization application.

MPR 124 may be implemented as a stand-alone set top box suitable for use in a co-axial or IP-based multimedia content delivery network. In other embodiments, MPR 124 may be integrated with display 126, CPE 122, or both. Referring to FIG. 2, a block diagram illustrating selected elements of MPR 124 is presented. In the depicted embodiment, MPR 124 includes a processor 201 coupled to storage media collectively identified as storage 210 via a shared bus 202. Storage 210 encompasses persistent and volatile media, fixed and removable media, and magnetic and semiconductor media. Storage 210 is operable to store instructions, data, or both. Storage 210 as shown includes two sets or sequences of instructions, namely, an operating system 212 and an application program identified as synchronous support 214. Operating system 212 may be a Unix or Unix-like operating system, a Windows® family operating system, or another suitable operating system. Synchronization support 214, as suggested by its name, may operate in conjunction with a synchronization application, which may be hosted on an application server or content delivery server of service provider 121, to communicate information and take action to synchronize two or more asynchronous streams of media.

MPR 124 as depicted in FIG. 2 further includes a network adapter 220 that interfaces MPR 124 to LAN 123 and through which MPR 124 receives multimedia content. In embodiments suitable for use in IP based content delivery networks MPR 124, as depicted in FIG. 2, may include a transport unit 230 that assembles the payloads from a sequence or set of network packets into a stream of multimedia content. In coaxial based access networks, content may be delivered as a stream that is not packet based and it may not be necessary in these embodiments to transport unit 230. In a co-axial implementation, however, clients 120 may require tuning resources (not explicitly depicted in FIG. 1) to "parse" desired content from other content that is delivered over the coaxial medium simultaneously and these tuners may be provided in MPRs 124. The stream of multimedia content received by transport unit 230 may include audio information and video information and transport unit 230 may parse or segregate the two to generate a video stream 232 and an audio stream 234 as shown.

Video and audio streams 232 and 234, as output from transport unit 230, may include audio or video information that is compressed, encrypted, or both. A decoder unit 240 is shown as receiving video and audio streams 232 and 234 and generating native format video and audio streams 242 and 244. Decoder 240 may employ any of various widely distributed video decoding algorithms including any of the Motion Pictures Expert Group (MPEG) standards, Windows Media Video (WMV) standards including WMV 9, which has been standardized as Video Codec-1 (VC-1) by the Society of Motion Picture and Television Engineers. Similarly Decoder 240 may employ any of various audio decoding algorithms including Dolby® Digital, Digital Theatre System (DTS) Coherent Acoustics, and Windows Media Audio (WMA).

The native format video and audio streams 242 and 244 as shown in FIG. 2 may processed by encoders/digital-to-analog converters (encoders/DACs) 250 and 260 respectively to produce analog video and audio signals 252 and 262 in a format compliant with display 126. Display 126 may comply with a National Television Systems Committee (NTSC), Phase Alternating Line (PAL) or any other suitable television standard.

Returning now to FIG. 1, the selected elements representing service provider 1212 include content acquisition resources 180 connected to a switch 140 via a backbone network 170. An application server 150 and a content delivery server 160 are also shown connected to switch 140. Switch 140 may provide firewall and routing functions to demarcate access network 130 from the resources of service provider 121. Switch 140 may be housed in a central office or other facility of service provider 121. In embodiments that employ DSL compliant connections, switch 140 may include elements of a DSL Access Multiplexer (DSLAM) that multiplexes many subscriber DSLs to backbone network 170. Backbone network 170 represents a private network preferably a fiber based network to accommodate tremendous data transfer rates. Content acquisition resources 180 as depicted in FIG. 1 encompasses the acquisition of various types of content including broadcast content, other "live" content including national content feeds, and video-on-demand content.

Acquired content is provided to a content delivery server 160 via backbone network 170 and switch 140. Content may be delivered from content delivery server 160 to clients 120 via access network 130 and switch 140. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content deliver server 160, different types of content may be delivered by different servers. Moreover, embodiments of network 100 may include content acquisition resources in regional offices that are connected to switch 140.

FIG. 1 further illustrates an application server 150 connected to switch 140. As suggested by its name, application server 150 may host or otherwise implement one or more applications for network 100. Applications provided by application server 150 may be downloaded and hosted on other network resources including, for example, content delivery server 160, switch 140, and CPE 122.

Although the service provider 121 is depicted in FIG. 1 as having a single switch 140 to which content acquisition, content delivery, and application servers are connected, other embodiments may employ different switches for each of these functional components and may include additional functional components not depicted in FIG. 1 including, for example, operational subsystem support (OSS) resources.

Content delivery server 160 may support unicasting and multicasting. Unicasting consumes more bandwidth per client 120 than multicasting, but unicasting enables a service provider to offer low latency or no latency content delivery to a wide number of clients 120. Multicasting may require additional effort to initiate, but results in bandwidth conservation. Some embodiments of network 100 as described herein address the low latency benefits of unicasting with the low bandwidth features and the interactive/collaborative potential of multicasting. More specifically, unicasting a stream to a requesting client 120 beneficially enables the viewer to see the requested stream with no apparent latency, delay, or other type of down time. It may be desirable for both the viewer and the provider; however, to "convert" the unicast client to a multicast client that is part of a multicast group. From the perspective of the service provider, multicasting beneficially reduces bandwidth consumption in a backbone of the providers network. From the client's perspective, being a part of a multicast group creates inter-viewer interaction and collaboration opportunities.

Some embodiments of the multimedia content distribution network 100 as described herein merge the benefits of unicasting and multicasting through various techniques to synchronize two or more viewers so that those users can become part of a common stream, a multicast stream, and collaborate or interact with each other in real time. Dynamic synchronization of two asynchronous viewers is achieved using different and varied techniques as described below.

Figure 3:
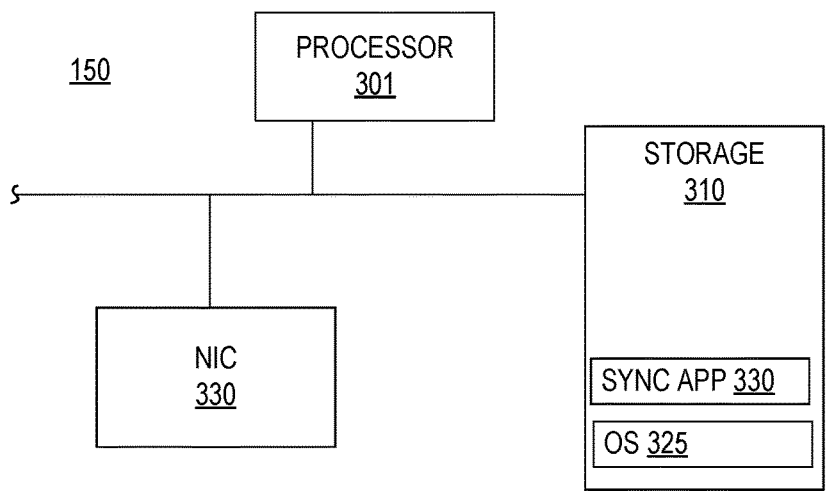
FIG. 3 is block diagram of selected elements of an embodiment of a server suitable for hosting a synchronization application.

In some embodiments, the disclosed synchronization functionality is implemented in software modules stored on application servers 150 and MPRs 124. In other embodiments, however, the synchronization functionality may be hosted or executed, at least in part, by content delivery server 160, switch 140 or another network resource. Referring briefly to FIG. 3, selected elements of an embodiment of application server 150 are illustrated. In the depicted embodiment, application server 150 includes a processor 301, storage media identified as storage 310, and a network interface adapter 320. In the depicted embodiment, processor 301 and network interface adapter 320 connect to a shared bus 305 that provides access to storage 310. Storage 310 encompasses persistent and volatile media, fixed and removable media, and magnetic, optical, and semiconductor media. Storage 310 may include processor executable instructions. The instructions embedded or otherwise stored in storage 310 may include an operating system 325 such as a Unix-based or Unix-like operating system or a Windows® based operating system. In addition, storage 310 as depicted in FIG. 3 includes a set of instructions identified as synchronization application (SA) 330. SA 330 may include instructions sufficient to enable two or more asynchronous clients 120 of multimedia content distribution network 100 to synchronize temporally. Although synchronous application 330 is depicted as being stored in a storage media of application server 150, SA 330 or portions thereof may be downloaded and executed on another network resource including content delivery server 160, switch 140, CPE 122, or elsewhere.

Figure 4:
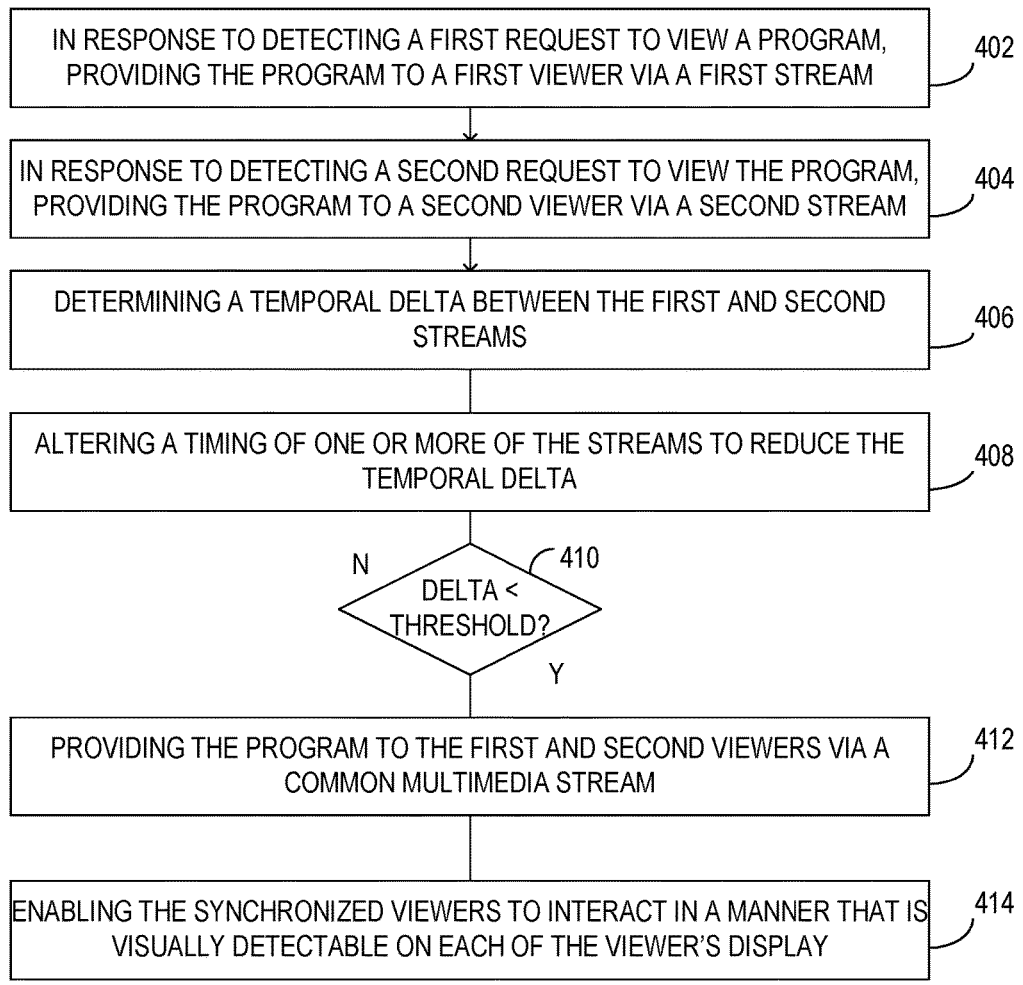
FIG. 4 is a flow diagram of selected elements of an embodiment of a method for synchronizing multiple content streams.

Turning now to FIG. 4, a flow diagram depicts selected elements of an embodiment of a method 400 for achieving synchronous content streams is depicted. Method 400, in some embodiments, represents functionality embedded in SA 330 and thus, FIG. 4 is representative a computer program product that includes SA 330. In addition, some embodiments of SA 330 may encompass the synchronization support resource 214 depicted in FIG. 2. As depicted in FIG. 4, method 400 includes providing (block 402) a program or other item of multimedia content to a first viewer by means of a first stream in response to detecting a first request to view the program from the first viewer. Method 400 as illustrated further includes providing (block 404) a program or other item of multimedia content to a second viewer by means of a second stream in response to detecting a second request to view the program from the second viewer.

In some embodiments, synchronization is performed selectively on two or more viewers. In these embodiments, method 400 may include selecting (block 405) two or more viewers, e.g., the first viewer and the second viewer, for synchronization. The process of selecting two or more viewers for synchronization may be based on buddy list information or other social network concepts. An exemplary method for synchronization in a social network context is now described with respect to FIG. 6 and FIG. 7.

Some implementations of the synchronization concepts disclosed herein are suitable for use in the context of a social network. A social network may refer to a subset of a service provider's subscribers. Social networks may be defined by buddy lists or other information by which viewers indicate other viewers that may be known to them or are otherwise of interest to them, for example, because they share common interests. In the context of a social network, some embodiments enable viewers to identify and select the other viewers with whom they might wish to synchronize so that, when they are synchronized, the viewers can chat or otherwise communicate, in real time, about the content they are viewing substantially simultaneously.

Figure 6:
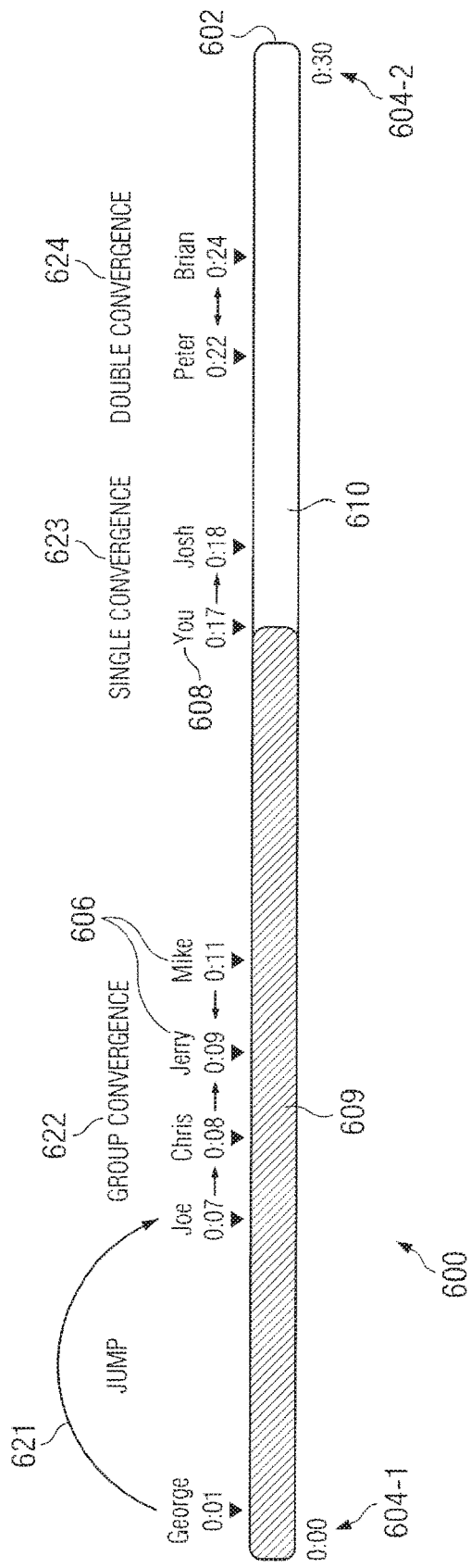
FIG. 6 illustrates an exemplary graphical image presented to a viewer according to one embodiment of a social network based method for synchronizing multimedia streams.

In some embodiments, social network based synchronization is facilitated or enhanced with graphical depictions of the set of viewers who are viewing a particular program. Referring to FIG. 6, an illustrative example of a timeline 600 depicts a set of viewers who are viewing a program and their relative "locations" within the program. Timeline 600 depicts information enabling a viewer to determine identities and relative temporal proximities of other viewers of the same program or content. As depicted in FIG. 6, for example, timeline 600 includes a program bar 602 and timeline indicators 604 including a first timeline indicator 604-1 indicating the beginning time, e.g., 0:00, of the program and a second timeline indicator 604-2 indicating an ending time, e.g., 0:30 (representing 30 minutes from the first timeline indicator 604-1).

Timeline 600 as shown in FIG. 6 also includes a number of viewer indicators 606. Viewer indicators 606 may include information indicating an identity and relative temporal proximity of other viewers who are viewing the same program. In the depicted embodiment, each viewer indicator 600 includes a username or other information identifying the viewer, a numeric representation of the viewer's chronological location in the program, i.e., an indication of what portion of the program the other viewer is currently viewing, and an arrow or pointer pointing to the approximate location within the program bar 602.

In addition to the viewer indicators 606, timeline 600 as depicted includes a viewer indicator 608 indicating the identity and chronological or temporal location of the viewer who is accessing the timeline 600, i.e., a viewer can see himself or herself represented by viewer indicator 608. Program bar 602 as shown in FIG. 6 includes a darkened portion 609 representing the portion of the program that has already been viewed and a whitened portion 610 representing the portion of the program that has yet to be viewed.

Figure 7:
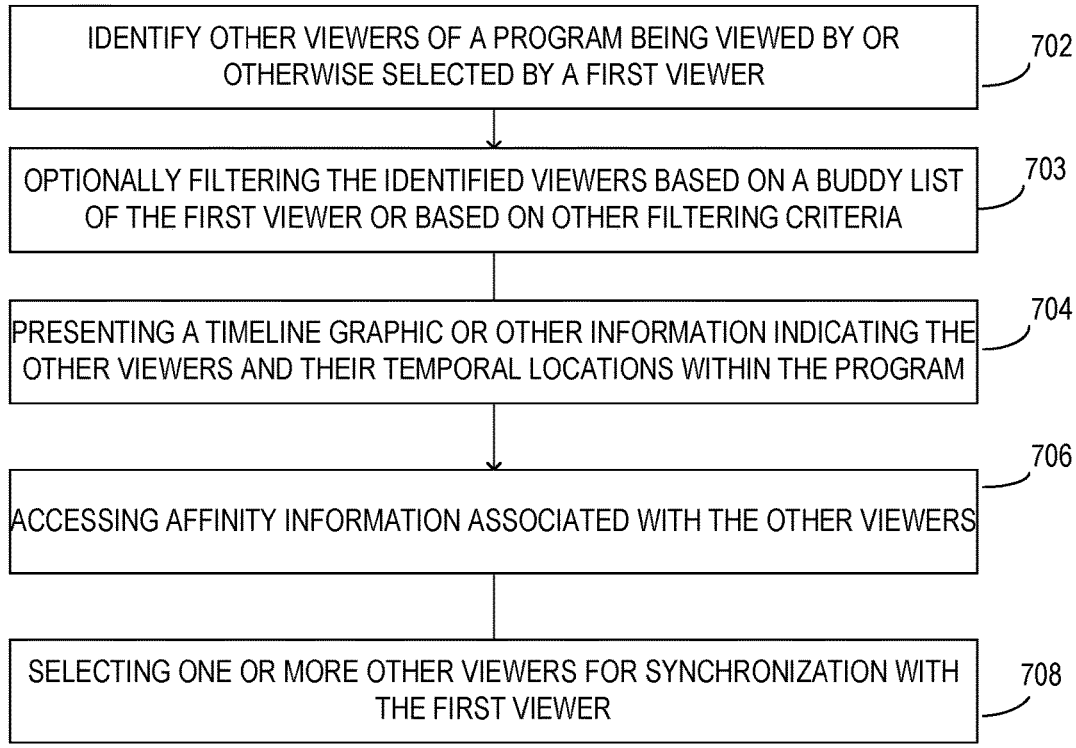
FIG. 7 is a block diagram of selected elements of an embodiment of a method for selecting viewers for synchronization.

Referring to FIG. 7, selected elements of an embodiment of a method 700 for selectively identifying and synchronizing viewers in a social network environment are depicted. Method 700 may be implemented as an application program that operates in conjunction with other synchronization applications. Method 700 may execute as customer premises equipment, within a viewer's MPR, or on a networked server. In the depicted embodiment, method 700 includes identifying (block 702) the other viewers of a particular program being viewed by or otherwise selected by a first viewer. The depicted embodiment of method 700 further includes an optional filtering block (block 703) in which the identified viewers are filtered based on a buddy list or other filter criteria to narrow the number of other viewers. The buddy list may include entries entered by the first user and/or entries determined or inserted automatically based on the first user's history. Buddy lists may be exchanged between users. In addition to buddy lists, filtering of other viewers for presentation to the first viewer may be done in other ways, e.g., geographically or otherwise.

Method 700 as shown further includes presenting (block 704) information indicative of the identified viewers to the first viewer. The presentation of other viewer information may be in the form of a timeline such as the timeline 600 depicted in FIG. 6. The information may include information identifying one or more other viewers and information indicating the temporal proximity of the other viewers to the first viewer. In some embodiments, the other-viewer information may exclude identity information so as to provide viewing data anonymously. For example, the first viewer might be able to filter anonymous other-viewer information based on gender, zip code, age, and so forth, for informational purposes. Similarly, the first viewer may make his or her viewing selections anonymously public to others.

Method 700 as depicted in FIG. 7 further includes accessing (block 706) affinity information associated with an identified other viewer. In the context of a buddy list or other similar social network concept, a buddy list entry may include an affinity field for indicating a quantitative or qualitative degree or quality of the relationship between the first viewer and the person associated with the buddy list entry. The first user may use the affinity field to indicate whether a buddy list entry corresponds to a close personal friend, a casual acquaintance, a close family member, a distant relative, a professional colleague, a business associate, a member of a common organization, and so forth. In some embodiments, method 700 may utilize affinity information to determine or influence the selection of a synchronization pair and/or the method of synchronization. For example, method 700 may use affinity information to select between two otherwise equivalent or approximately equivalent synchronization candidates. A close personal friend may receive priority over a distant relative in terms of selecting an other viewer to synchronize with the first viewer.

In addition, method 700 may use affinity information to determine the nature or aggressiveness of the synchronization. Synchronization requires more or less effort depending, at least to some extent on the temporal proximity of two viewers. If two viewers are viewing a program with only a few seconds of less separating the two viewers, synchronization can be easily achieved by speeding up the playback of the later-in-time viewer, slowing down the earlier-in-time viewer, or a combination of both. As two viewers become more temporally distant, the ability to achieve synchronization easily and transparently diminishes. If two viewers are so temporally distant that any attempt to synchronize the two viewers using altered playback rates would require playback rates that would be noticeably irregular. Two viewers may, nevertheless, wish to require or request aggressive synchronization depending on the degree of affinity between them.

The depicted embodiment of method 700 further includes selecting (block 708) one or more other viewers for synchronization with the first viewer. As indicated above, selection of viewers for synchronization may be based at least in part on buddy list information including affinity information, as well as the temporal proximity of the two viewers, and other factors.

Continuing with FIG. 4, the depicted embodiment of method 400 includes determining (block 406) a temporal delta between the first and second streams and altering (block 408) one or more of the streams by, altering, in some embodiments, the relative timing of the first and second streams in a manner that reduces the temporal delta between two or more streams. Depending upon the implementation, the altering of the temporal delta between two or more streams, also referred to as synchronizing two or more streams may be achieved using different techniques. The synchronization techniques may differ in terms of complexity and aggressiveness and the selection of the synchronization technique may be determined or influenced by buddy list information including affinity information as described previously. The exemplary timeline 600 depicted in FIG. 6 illustrates four different synchronization techniques including a jump convergence synchronization technique indicated by reference numeral 621, a group convergence 622, a single convergence 623, and a double convergence 624. Jump convergence 621 is the most aggressive, disruptive, and fastest of the synchronization techniques depicted. Jump convergence may be employed when the affinity between the two users is of a degree that necessitates or permits the synchronization procedure to disrupt the multimedia stream of one of the viewers, for example, the later in time viewer such as the viewer identified as "George" in FIG. 6. In jump synchronization, the multimedia stream to the later-in-time viewer is terminated and a new stream is started at the point in time of the other viewer. Jump convergence may also represent the only viable convergence method when two viewers who wish to be synchronized are too distant in terms of temporal proximity to enable the use of playback rate manipulation.

Group convergence 622 may be employed to synchronize a group of three or more viewers. When a group of viewers wishes to synchronize and all of the viewers are sufficiently close in time to permit playback rate manipulation techniques, group convergence includes selecting one of the group members as the target for synchronization. The synchronization target may be selected determined algorithmically so that synchronization requires the least amount of stream manipulation possible. Alternatively, the synchronization target may be selected explicitly or determined based on who requested the synchronization, which viewer is furthest ahead in time, or on any number of any other determinable factors.

FIG. 6 also depicts single convergence 623 and double convergence 624. Single convergence 623 may represent a "standard" or default convergence technique. In the depicted embodiment, single convergence includes speeding up the playback rate of the later in time viewer "You" until the later in time viewer convergences with the earlier in time viewer. In other embodiments, single convergence is achieved by slowing down the playback rate of the earlier in time viewer "Josh." Determining whether to perform single convergence by slowing down or speeding up may be predetermined, determined based on the temporal position of the viewer who submits the synchronization request, or in another manner. Double convergence 624 is illustrated in FIG. 6 includes a combination of speeding up the playback rate of the later in time viewer "Peter" and slowing down the playback rate of the earlier in time viewer until the two viewers converge. Other things being equal, double convergence 624 achievers convergence more quickly than single convergence, but is more complex in that it requires manipulation of two multimedia streams.

Depending upon the implementation, convergence can be initiated from the display of timeline 600 using a conventional remote control. In some embodiments, the remote control enables the viewer to select one or more of the viewable items of timeline 600. The viewer may, for example, wish to synchronize with the viewer "Josh." Using the remote control, the viewer may sequentially highlight each of the depicted other viewers until the desired viewer "Josh" is highlighted. The viewer may then initiate synchronization by pressing a "Select" or other suitable button of the remote control. In some embodiments, the synchronization method may determine automatically the best method of synchronization while, in other embodiments, the requesting viewer may be prompted to indicate the best method of synchronization.

Returning to FIG. 4, the temporal delta between two streams may be compared (block 410) to a specified threshold. If the temporal delta is below the threshold, method 400 provides (block 412) the program to the first and second viewers via multicast stream that is common to both viewers. In this embodiment, either of the first and second streams or both may be unicast streams, in which case method 400 includes converting a stream received by an MPR 124 from a unicast stream to a multicast stream.

The determination of the temporal delta may be based on timestamps. For example, when an MPR issues a request for a program, the content delivery server may receive the request and generate a timestamp or the MPR may incorporate a timestamp into the request. The temporal delta in this case might be the difference between two (or more) starting timestamps. In another embodiment, the timestamps may be generated by the MPRs based on their detecting a processing a particular frame or other fragment of a stream. In this embodiment, a frame may be "fingerprinted" or uniquely identified by hashing the binary values that represent the frame. An MPR may identify a particular frame when the frame is processed by the MPR and the MPR may associate a timestamp with the frame. When the same frame within a second stream of the program is processed by a second MPR, the frame may be identified by the second MPR and a second timestamp generated. In this manner, the temporal delta between any pair of streams may be determined.

Figure 5:
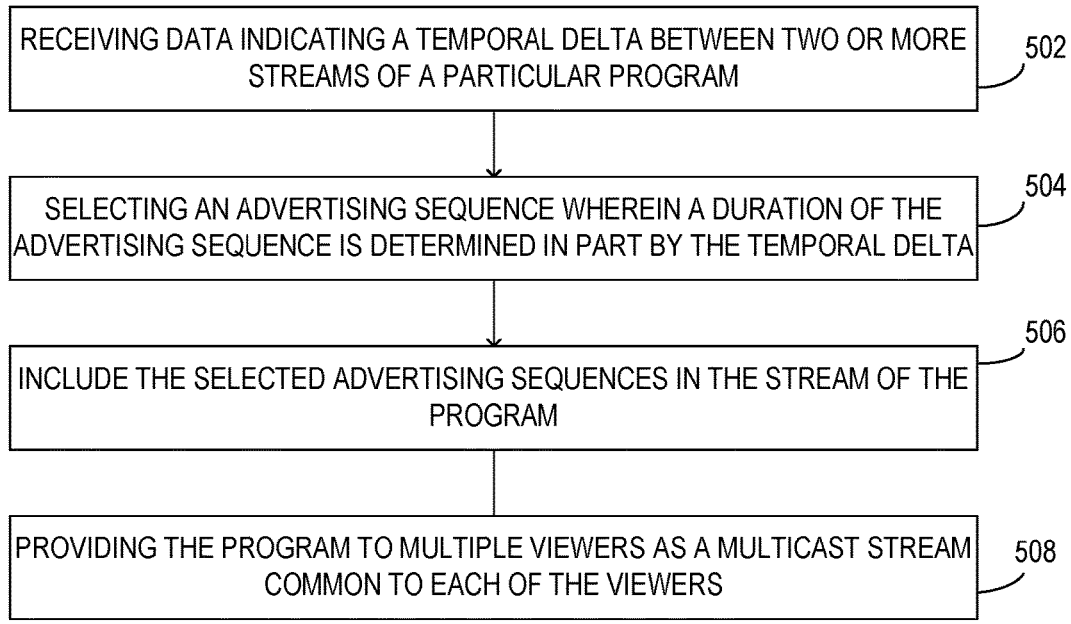
FIG. 5 is a flow diagram emphasizing additional detail of selected elements of the flow diagram of FIG. 4.

Referring momentarily to FIG. 5, the depicted flow diagram illustrates selected elements of an embodiment of a method for altering the temporal delta of two streams in block 408. As depicted in FIG. 5, the temporal delta is altered by receiving (block 502) or otherwise detecting data indicating a temporal delta between two or more streams of a particular program. Method 500 as shown includes selecting (block 502) additional content in the form of an advertising sequence that has a desired length in time or duration. The duration of the advertising sequence is selected so that, when the additional content is included in the program stream, the temporal delta is reduced. Method 500 may be executed by one or more MPRs 124 where each MPR 124 may select an advertising sequence or other form of additional content having a desired duration so that, when the additional content items are incorporated into their respective program streams, the temporal delta between any pair of streams is reduced. Program streams that are ahead or earlier in time may receive additional content that is longer in duration than program streams that are behind or later in time. As depicted in FIG. 5, method 500 further includes incorporating (block 506) or otherwise including the additional content items into their respective program streams to alter the temporal delta. The resulting temporal delta may be compared (block 508) to a threshold value and, if the temporal value is sufficiently low, method 500 may include each of the MPRs 124 acquiring the program via a multicast stream that is common to all of the synchronized viewers.

In another embodiment, altering the temporal delta may be achieved at the MPR level by altering the playback rate of one or more of the streams. In this embodiment, a stream that is earlier in time may be subjected to slower playback rate while a stream that is behind in time is played back at a higher rate. The altered playback rates are preferably not so different as to alter the viewers perception of the content, e.g., higher or lower voices.

Returning to FIG. 4, method 400 as shown includes enabling (block 414) at least some of the viewers that are synchronized with each other, whether receiving a multicast stream or multiple synchronous unicast streams, to interact with each other. Content delivery server 160 may monitor information indicating which clients 120 are receiving synchronized streams of a program. The content delivery server 160 may then transmit information identifying the clients to the MPRs 124. An MPR 124, if enabled by the viewer to do so, may then compare the list of synchronized viewers against a list of buddies associated with the MPR 124. Any synchronized viewers that appear on the buddy list of an MPR 124 may then be identified to the viewer. Identifying the synchronized viewers may be achieved, in some embodiments, by overlaying icons, avatars, or other graphical representations of particular viewers on the display screen. In these embodiments, the graphical representation of the synchronized viewers appears overlaying the program that is playing. The synchronized viewers may then interact with each using text messages or other elements of interaction, e.g., emoticons, etc. When an interaction from a synchronized viewer occurs, the interaction may appear on the display of all of the synchronized viewers in a manner that visually associates the interaction with the viewer that authored it.

When more than two viewers are candidates for synchronization, one embodiment of method 400 enables a viewer to select the other viewer or viewers with whom he wishes to synchronize. If, for example, a viewer's stream of a program is close in time to the streams of two others, the viewer may select to synchronize, and interact, with just one of them. This selective synchronization may be expanded to include encompass three or more viewers. In these cases, the synchronization of the viewers may be achieved by altering the timing of all the viewers to converge on a single time reference, altering the timing of only the lagging streams to catch up to the earlier streams, altering the timing of the earlier streams to slow them down, or any combination thereof. If a viewer has a temporal delta that cannot be overcome with altered playback speeds or advertising sequences, the viewer may still be synchronized by "jumping" the viewer to a synchronized time frame. In this case, however, the user may notice that a flicker or other artifact of the synchronization. It is a feature of the disclosed subject matter that the synchronization is achieved without pooling groups of viewer requests into multicast groups, which causes at least some of the viewers to experience a delay or latency between a request for programming and initial delivery of the programming.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the claimed subject matter is to be determined by the broadest permissible interpretation of the following claims and their equivalents, and shall not be restricted or limited by the foregoing detailed description.

What is claimed is:

1. A multimedia content delivery method, comprising:
    determining a temporal difference between a first stream of multimedia content and a second stream of the multimedia content wherein the first stream of multimedia content is provided to a first viewer and the second stream is provided to a second viewer and wherein the temporal difference comprises an interval of time corresponding to an offset of the first stream relative to the second stream;
    adjusting at least one of the first stream and the second stream to reduce the temporal difference; and
    responsive to determining that the temporal difference is less than a particular threshold, providing a common stream of the multimedia content to the first viewer and the second viewer and including a visually detectable indication of the interaction in a display of the multimedia content to the first user in response to detecting an interaction between a first user of the first stream and a second user of the second stream;
    wherein determining the temporal difference comprises determining the temporal difference in accordance with a difference between a first timestamp associated with the first stream and a second timestamp associated with the second stream.

2. The method of claim 1, further comprising:
    identifying other users of the multimedia content; and
    selecting one of the other users as the second user.

3. The method of claim 2, wherein selecting one of the other users as the second user includes selecting one of the other users as the second user in accordance with buddy list information associated with the first stream.

4. The method of claim 3, wherein selecting one of the other users as the second user includes selecting one of the other users as the second user in accordance with affinity information included in the buddy list information.

5. The method of claim 4, wherein the affinity information influences an aggressiveness of the adjusting of the first stream.

6. The method of claim 3, further comprising:
    selectively displaying visually detectable indications of particular users of the multimedia content, where the particular users comprise users identified in the buddy list information.

7. The method of claim 1, wherein the first timestamp and the second timestamp indicate respective start times of the first stream and the second stream.

8. The method of claim 7, wherein the first timestamp and the second timestamp indicate respective times for processing a particular frame within the respective streams.

9. The method of claim 1, wherein adjusting at least one of the first stream and the second stream includes inserting first added content into the first stream and second added content into the second stream wherein a difference in duration of the first added content and the second added content reduces the temporal difference.

10. The method of claim 9, wherein adjusting at least one of the first stream and the second stream includes inserting the first added content at a point of the multimedia content selected in accordance with reducing perceptible flicker.

11. The method of claim 1, further comprising:
    displaying a visually detectable representation of a second user.

12. The method of claim 11, wherein the visually detectable representation of the second user overlays a display of the multimedia content.

13. A computer readable medium, including processor executable program instructions, that, when executed by a processor, cause the processor to perform operations comprising:
    determining a temporal difference between a first stream of multimedia content and a second stream of the multimedia content wherein the first stream of multimedia content is provided to a first viewer and the second stream is provided to a second viewer and wherein the temporal difference comprises an interval of time corresponding to an offset of the first stream relative to the second stream;
    adjusting at least one of the first stream and the second stream to reduce the temporal difference; and
    responsive to determining that the temporal difference is less than a particular threshold, providing a common stream of the multimedia content to the first viewer and the second viewer and including a visually detectable indication of the interaction in a display of the multimedia content to the first user in response to detecting an interaction between a first user of the first stream and a second user of the second stream;
    wherein determining the temporal difference comprises determining the temporal difference in accordance with a difference between a first timestamp associated with the first stream and a second timestamp associated with the second stream.

14. The computer readable medium of claim 13, wherein adjusting at least one of the first stream and the second stream includes inserting a first added content sequence into the first stream and a second added content sequence into the second stream wherein a difference in duration of the first added content sequence and the second added content sequence reduces the temporal difference.

15. The computer readable medium of claim 14, wherein the first added content sequence comprises a first advertising sequence and the second added content sequence comprises a second advertising sequence and wherein adjusting at least one of the first stream and the second stream includes inserting the first added content sequence at a point of the multimedia content selected in accordance with reducing perceptible flicker.

16. The computer readable medium of claim 13, wherein the operations include:
    identifying other users of the multimedia content; and
    selecting one of the other users as the second user in accordance with buddy list information associated with the first stream.

17. The computer readable medium of claim 16, wherein affinity information included with the buddy list information influences an aggressiveness of the adjusting of the first stream.

18. An application server, comprising:
    a network interface adapter for coupling to a network;
    a processor; and
    a computer readable storage device including processor executable program instructions that, when executed by the processor, cause the processor to perform operations comprising:

determining a temporal difference between a first stream of multimedia content and a second stream of the multimedia content wherein the first stream of multimedia content is provided to a first viewer and the second stream is provided to a second viewer and wherein the temporal difference comprises an interval of time corresponding to an offset of the first stream relative to the second stream and wherein determining the temporal difference comprises determining the temporal difference in accordance with a difference between a first timestamp associated with the first stream and a second timestamp associated with the second stream;

adjusting at least one of the first stream and the second stream to reduce the temporal difference;

detecting an interaction between a first user of the first stream and a second user of the second stream;

responsive to determining that the temporal difference is less than a particular threshold, providing a common stream of the multimedia content to the first viewer and the second viewer and including a visually detectable indication of the interaction in a display of the multimedia content to the first user.

19. The server of claim 18, wherein adjusting at least one of the first stream and the second stream includes inserting first added content into the first stream and second added content into the second stream wherein a difference in duration of the first added content and the second added content reduces the temporal difference.

* * * * *